United States Patent [19]

Pawar et al.

[11] Patent Number: 5,095,086
[45] Date of Patent: Mar. 10, 1992

[54] SCUFF-MASKING COATINGS FOR GLASS ARTICLES

[75] Inventors: Prakash K. Pawar, Clifton Park; Frank J. Traver, Troy, both of N.Y.

[73] Assignee: General Electric Company, Waterford, N.Y.

[21] Appl. No.: 564,927

[22] Filed: Aug. 8, 1990

[51] Int. Cl.$^5$ .................. G08G 77/06; G08G 77/04; B32B 9/04
[52] U.S. Cl. ........................ 528/17; 525/477; 523/170; 524/268
[58] Field of Search ............ 523/170; 524/266, 268; 528/17; 525/477

[56] References Cited

U.S. PATENT DOCUMENTS

| | | | |
|---|---|---|---|
| 4,273,834 | 6/1981 | Yokokura et al. | 428/429 |
| 4,370,385 | 1/1983 | Yoshida et al. | 528/17 |
| 4,467,068 | 8/1984 | Maruyama et al. | 524/731 |
| 4,656,221 | 4/1987 | Kurita et al. | 524/731 |
| 4,677,147 | 6/1987 | Swihart et al. | 524/268 |
| 4,681,908 | 7/1987 | Broderick et al. | 524/268 |
| 4,801,445 | 1/1989 | Fukui et al. | 428/405 |
| 4,837,274 | 6/1989 | Kawakubo et al. | 524/266 |
| 4,871,616 | 10/1989 | Kimura et al. | 428/407 |
| 4,895,766 | 1/1990 | Saad | 524/266 |
| 4,985,286 | 1/1991 | Kurita et al. | 428/34.7 |

FOREIGN PATENT DOCUMENTS 61-265381  11/1986  Japan .

*Primary Examiner*—Paul R. Michl
*Assistant Examiner*—Christopher P. Rogers

[57] ABSTRACT

An improved coating composition suitable for concealing scuff marks on glass articles is provided, comprising by weight (A) from about 70 to about 100 percent of a composition comprising by weight (1) from about 50 to 75 percent of an organooxy-chainstopped organopolysilsequioxane having a viscosity of from about 5 to about 1000 centipoise at 25° C., (2) from about 5 to about 15 percent of tetraorganotitanate, (3) from about 0 to about 25 percent of an organotriorganooxysilane, and (4) from about 0 to about 15 percent of a carboxylic acid ester, and (B) from about 0 to about 30 percent of a volatile diluent. The coating formed from this composition has improved cure rate and masks wet bottles uniformly and completely.

34 Claims, No Drawings

SCUFF-MASKING COATINGS FOR GLASS ARTICLES

BACKGROUND OF THE INVENTION

This invention relates to coating compositions for masking scuff marks on glass articles. More particularly, this invention relates to improved fast curing coating compositions for masking scuff marks on glass bottles.

Glass vessels which are used for beer, soft drinks, milk and the like in some countries are generally returnable and are recovered after use from the market and reused. During bottling processes, e.g., packaging, or transportation, such bottles undergo considerable abrasion damage, e.g., grazing, scratching, galling, scoring, and similar abrasive action (hereinafter referred to collectively as "scuffing") whereby scuff marks are left on the surfaces of the glass bottles. Scuffing phenomena is aggravated by mechanical grinding due to bottle-to-bottle pressure, mould lines, guide rails, and caustic etching and leaching. As a result, the appearance of the glass bottles is markedly impaired, and the commodity value of the resulting bottled beverages is lowered.

Efforts have been made to improve glass formulations and surface treatments for concealing scuff marks on bottle surfaces. Reference is made, for example, to U.S. Pat. Nos. 4,273,834 (Yokokura et al.); 4,656,221 (Kurita et al.); and 4,467,068 (Maruyama et al.).

U.S. Pat. No. 4,273,834 to Yokokura et al. (Yokokura) disclose a scuff-masking composition for glass vessels, wherein the composition comprises an organopolysiloxane terminated with a phenyl group, a methyl group, and an alkoxy group, and a curing catalyst, e.g., tetrabutyltitanate or dibutyltin dilaurate. The ratio of the phenyl, methyl, and alkoxy groups to one another is critical to the scuff-masking properties of the coating in Yokokura.

U.S. Pat. No. 4,656,221 to Kurita et al. (Kurita) discloses a composition for concealing graze marks on transparent glass bottles, the composition comprising a polydiorganosiloxane containing silicon-bonded organic groups selected from phenyl groups, aralkyl groups, and alkyl groups, a film-forming polyorganosiloxane containing a straight-chain diorganosiloxane portion and a cross-linking portion formed by the reaction of an amino or nitrogen group with an epoxy group and an oxygen atom, a cationic surfactant, and water.

U.S. Pat. No. 4,467,068 to Maruyama et al. (Maruyama) is directed to a composition for concealing grazes or scratches on glass surfaces, wherein the composition comprises an emulsion formed from a composition (A) which has as its principal ingredient a film-forming polyorganosiloxane and a composition (B) which has as its principal ingredient a liquid polydiorganosiloxane.

Another surface treatment presently used in Japan involves the use of a silicone coating containing organooxy-chainstopped organopolysilsequioxane, high levels of volatile diluent, e.g., greater than 75%, and low levels of curing catalyst. This silicone coating has several major drawbacks.

One drawback to the silicone coating described above is its inherent slow cure rate, i.e., approximately 2 to 4 days depending on the ambient conditions, which is the result of the coating's high content of volatile diluent and low content of curing catalyst, which inhibit cure rate. The slow cure rate in turn causes the coating to be tacky for a longer period of time. The increase in the tackiness period presents a problem because, in the United States, after the coating has been applied to the bottle surface, beer and soft drink bottles are packaged in clay-coated paper containers. The tackiness of the silicone coating on the bottle during the curing process causes the coating to pick up clay material from the paper container, resulting in blemishes on the surface of the coated bottle. Thus, the longer the coating is tacky, the more clay material is picked up and the more blemishes that result.

Another drawback to the silicon coating described above is its inability to completely cost "wet" bottle surfaces. In the united States, beer undergoes a pasteurization process wherein the bottle containing beer is immersed in a cold water bath and chilled. After completion of the pasteurization process, the chilled bottle is removed from the water bath and dried. However, water forms on the surface of the chilled bottle's surface as a result of condensation caused by the temperature difference between the chilled bottle and the ambient atmosphere, rendering the surface of the bottle wet.

The low solids silicone coating described above appears to coat the wet bottle completely but upon cure, the coating becomes uneven and forms blotches on the bottle surface, resulting in incomplete masking of scuff marks and an unattractive appearance.

It is an object of this invention, therefore, to provide a fast curing scuff-masking coating for glass articles.

It is a further object of this invention to provide a fast curing scuff-masking coating for glass articles, wherein the coating cures to form a uniform and non-blotchy coating on wet glass surfaces.

These objects are achieved in the present invention.

SUMMARY OF THE INVENTION

The present invention is based on the discovery that the cure rate and masking properties of a silicone coating composition containing an organooxy-chainstopped organopolysilsequioxane and a volatile diluent is improved by using higher levels of a tetraorganotitanate curing catalyst and zero or low levels of volatile diluent.

The present invention provides an improved curable coating composition suitable for concealing scuff marks on glass articles, comprising by weight:

(A) from about 70 to about 100 percent of a component comprising by weight:

(1) from about 50 to 75 percent of an organooxy-chainstopped organopolysilsequioxane having a viscosity of from about 5 to about 1000 centipoise at 25° C. and consisting essentially of $RSiO_{3/2}$ units and $R(R^1O)_{3-2n}SiO_n$ units, wherein n is a number equal to 0, $\frac{1}{2}$, or 1, wherein R and $R^1$ are independently a monovalent hydrocarbon radical containing from 1 to about 20 carbon atoms, the ratio of $RSiO_{3/2}$ units to $R(R^1O)_{3-2n}SiO_n$ units being from about 1:1 to about 50:1;

(2) from about 5 to about 15 percent of tetraorganotitanate, having the general formula

$$Ti(OR^2)_4$$

wherein $R^2$ is a monovalent hydrocarbon radical containing from about 1 to about 10 carbon atoms;

(3) from about 0 to about 25 percent of an organotriorganooxysilane having the general formula $R^3(R^4O)_3Si$, wherein $R^3$ and $R^4$ are independently monovalent hydrocarbon radicals containing from 1 to about 20 carbon atoms; and (4) from about 0 to about 15 percent of a carboxylic acid ester; and (B) from about 0 to abut 30 percent of a volatile diluent.

The composition of this invention provides a coating for concealing scuff marks on glass articles, e.g., glass bottles, wherein the coating cures faster and masks wet bottle surfaces completely.

The present invention is further directed to glass articles, particularly glass bottles, having deposited on the surface thereof the curable and cured compositions of this invention.

DETAILED DESCRIPTION OF THE INVENTION

The composition of the present invention comprises a weight (A) from about 70 to about 100 percent of a component comprising by weight (1) from about 50 to 75 percent of an organooxy-chainstopped organopolysilsequioxane; (2) from about 5 to about 15 percent of tetraorganotitanate; (3) from about 0 to about 25 percent of an organotriorganooxysilane; and (4) from about 0 to about 15 percent of a carboxylic acid ester, and (B) from about 0 to about 30 percent of a volatile diluent.

Component (A) is present in an amount ranging from 70 to about 100, preferably from about 80 to 100, and most preferably from about 90 to about 100, percent by weight based on the combined weight of components (A) and (B).

Component (A)(1) is an organooxy-chainstopped polyorganosilsequioxane having a viscosity of from about 5 to about 1000, preferably from about 5–500, and most preferably from about 10 to about 200 and consisting essentially of $RSiO_{3/2}$ units and $R(R^1O)_{3-2n}SiO_n$ units, wherein R and $R^1$ are independently monovalent hydrocarbon radicals containing from 1 to about 20, preferably from about 1-12, and most preferably from about 1 to about 8, carbon atoms, the ratio of $RSiO_{3/2}$ units to $R(R^1O)_{3-2n}SiO_n$ units being from about 1:1 to about 50:1, preferably from about 3:1 to about 20:1, and most preferably from about 4:1 to about 8:1. Examples of radicals represented by R and $R^1$ include alkyl groups such as methyl, ethyl, and isopropyl; cycloaliphatic radicals such as cyclopentyl and cyclohexyl; olefinic radicals, such as vinyl and allyl; and the phenyl radical. Preferably, R and $R^1$ are both methyl groups.

Component (A)(1) is present in an amount within the range of 50 to 75, preferably from about 60 to about 70, and most preferably from about 60 to about 65, percent by weight based on the total weight of component (A).

Component (A)(1) can be prepared by the low acid partial hydrolysis of an organotriorganooxysilane in the presence of an aqueous solution of an aliphatic alcohol. A catalyst, HCl, is introduced at a controlled low level as organotrichlorosilane. This minimizes the HCl/methanol side reaction which produces water, altering the critical hydrolysis stoichiometry. Partial hydrolysis followed by a vacuum strip to 60°-70° C. at 20 torr in the presence of an alkaline earth metal carbonate provides a resin having a 5 to 10 weight percent methoxy content based on solids.

Examples of suitable organotriorganooxysilanes as starting materials for the component (A)(1) resin include methyltrimethoxysilane, methyltriethoxysilane, methyltripropoxysilane, methyltributoxysilane, and the like. Methyltrimethoxysilane is preferred.

Examples of suitable aliphatic alcohols include methanol, ethanol, propanol, and the like. Methanol is preferred.

Examples of suitable organotrichlorosilanes include methyltrichlorosilanes, ethyltrichlorosilanes, and the like. Methyltrichlorosilanes are preferred.

Component (A)(2) is a tetraorganotitanate having the general formula

$Ti(OR^2)_4$ wherein $R^2$ is a monovalent hydrocarbon radical containing from about 1 to about 10 carbon atoms, and preferably from about 2 to about 8 carbon atoms. Most preferably, $R^2$ is a butyl radical, i.e., component (A)(2) is most preferably tetrabutyltitanate.

Component (A)(2) acts as a catalyst or cross-linker for the Component (A)(1) resin.

The amount of Component (A)(2) is critical to the present invention. If there is too little present, cure rate remains substantially slow. Too much of Component (A)(2) results in the formation of a white film, i.e., $TiO_2$, on the wet surface of the bottle. Too avoid these problems, Component(A)(2) is present in an amount within the range of from about 5 to about 15, preferably from about 8 to about 15, and most preferably from about 12 to about 15, percent by weight, based on the weight of component (A).

Component (A)(3) is an organotriorganooxysilane having the general formula $R^3(R^4O)_3Si$, wherein $R^3$ and $R^4$ are independently monovalent hydrocarbon radicals containing from 1 to about 20, preferably from about 1 to about 12, and most preferably from about 1 to about 8, carbon atoms. Examples of suitable organotriorganooxysilanes include methyltrialkoxysilane such as, for example, methyltrimethoxysilane, methyltriethoxysilane, methyltripropoxysilane, and methyltributoxysilane. Preferably, Component (A)(3) is methyltriethoxysilane.

Component (A)(3) can be obtained by alkoxylation of an organotrichlorosilane, e.g., methyltrichlorosilane, with suitable alcohols, e.g., ethanol, according to conventional processes.

Component (A)(3) is present in an amount within the range of from about 0 to about 25, preferably from about 10 to about 20, and most preferably from about 14 to about 20 percent by weight, based on the weight of component A.

The function of Component (A)(3) in the composition of this invention is to accelerate the cure rate.

Component (A)(4) is a carboxylic acid ester. Carboxylic acid esters having from about 6 to about 22 carbon atoms are preferred. They can be either aliphatic or aromatic and can contain either one or more ester groups. Examples of suitable carboxylic acid esters include ethyl laurate, isopropyl myristate, isopropyl palmitate, isopropyl behenate, decyl acetate, behenyl butyrate, hexadecyl acetate, decyl decanoate, methyl oleate, lauryl laurate, oleyl acetate, and dioctyladipate. Especially preferred for use in this invention is isopropyl myristate.

Component (A)(4) is present in an amount within the range of from 0 to about 15, preferably from about 5 to about 15, and most preferably from about 8 to about 12, percent by weight, based on the weight of component A.

Component (A)(4) functions as a plasticizer in the composition.

The composition of this invention comprises (B) from about 0 to about 30 percent by weight based on the total weight of components (A) and (B) of a second component comprising a volatile diluent. Component (B) is a volatile silicone or organic fluid. As used herein, "volatile" refers to those materials which have a measurable vapor pressure at ambient conditions.

Suitable volatile silicone fluids may be cyclic or linear. A description of various volatile silicone oils is found in Todd, et al., "Volatile Silicone Fluids for Cosmetics", 91 Cosmetics and Toiletries, 27-32 (1976), incorporated by reference herein. Linear volatile silicones generally have viscosities of less than about five centistokes at 25° C., whereas the cyclic silicones have viscosities of less than about 10 centistokes.

In general, the volatile silicone fluid can be any combination of tetramer, pentamer, and hexamer, or a low viscosity diorgano fluid. Generally, suitable cyclic volatile silicone fluids can be represented by the formula:

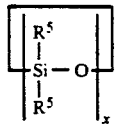

wherein $R^5$ is a 1 to 3 carbon alkyl group and x is a number from 3 to 10, preferably from 3 to 7.

Examples of volatile silicone fluids useful in the present invention include, for example, (a) (i) SF 1202, containing a pentamer in a minimum amount of 95%, and 5% of other cyclics; (ii) SF 1204, containing 85% of pentamer and 15% of tetramer; (iii) SF 1173, containing 95% of tetramer and 5% of other cyclics; all of the foregoing products being available from General Electric Company; and (b) Dow Corning 344 fluid, wherein $R^5$ is methyl and wherein the fluid typically comprises by weight about 88% tetramer, about 11.8% pentamer, and traces of trimer and hexamer.

The preferred volatile silicone fluids for use in this invention are cyclics such as cyclomethicone pentamer and the cyclomethicone tetramer, and linears such as phenethylpentamethyldisiloxane. The most preferred volatile silicone fluid is the cyclomethicone pentamer.

Examples of suitable volatile organic fluids are linear or branched isoparaffinic hydrocarbons having about 6 to about 16 carbon atoms and preferably about 10 to about 14 carbon atoms. The most preferred isoparaffinic hydrocarbons are those available from Exxon Corporation and having the designation ISOPAR (Registered Trade Mark).

The composition of this invention does not require the presence of the volatile fluid. When it is present, it is critical that the amount of the volatile fluid be relatively low. If there is too much of the volatile fluid present, the cure rate of the composition will be slow, resulting in the problems discussed previously herein. Thus, the volatile fluid is present in the composition of this invention in an amount within the range of from 0 to about 30, preferably from about 0 to about 20, and most preferably from about 0 to about 10, percent by weight of the total composition.

The composition of the present invention can be prepared by mixing the organotriorganooxysilane (Component (A)(1)), followed by the addition of the plasticizer (Component (A)(4)). The ingredients are blended until uniform. The catalyst (Component (A)(2)) is then added to the mixture.

The curable composition is then applied to the surface of a bottle or other glass article by brush-coating, puff-coating, dip-coating, and the like, and the bottle is allowed to stand at room temperature until curing is complete. The thickness of the coating can be varied according to the degree of thickness needed to effectively conceal the scuff marks. Typically, the thickness of the coat is be within the range of from about 1.3 to about 4.0 microns. The coating formed on the surface of the glass bottle has a refractive index of from about 1.35 to about 1.45, preferably from about 1.40 to about 1.45.

In order that those skilled in the art may better understand the practice of the present invention, the following examples are given by way of illustration and not by way of limitation.

EXPERIMENTAL

Example 1 illustrates a method for making methoxy-chain-stopped polymethylsilsequioxane, used as component (A)(1) in the examples below.

EXAMPLE 1

A methyltrimethoxysilane (81 parts) was charged to a glass-lined hydrolyzer fitted with a reflux condenser. Methanol (9.2 parts) was then added to the hydrolyzer. Methyltrichlorosilane was then added in an amount sufficient to provide an HCl concentration of at least 900 ppm. Water (9.8 parts) was charged to a suitable addition vessel and added to the silane blend over a period of 15-30 minutes. The solution heated to reflux (approximately 65° C.) quite readily. At the end of the water addition, reflux was continued at 120° C. for 30-60 minutes, with heat being applied as necessary, to remove the methanol. After refluxing was complete, 0.31 part of sodium carbonate was added to the refluxed mixture. The mixture was then refluxed at 145° C. at 45 torr until a solids content of 95% were obtained.

Example 2 illustrates the preparation of the composition of this invention.

EXAMPLE 2

The methoxy-chainstopped polymethylsilsequioxane prepared in Example 1 was mixed with methyltriethoxysilane and isopropyl myristate at room temperature with continous stirring. The ingredients were stirred until a homogeneous mixture was formed. Tetrabutyl titanate was then added and the resulting mixture was stirred until uniform. The composition was then applied to the surface of a wet 12 ounce beer bottle by a combination of brush- and puff-coating techniques and allowed to cure. The laboratory temperature was approximately 72° F. and the relative humidity was approximately 40%. The thickness of the coating was from about 1.3 to about 4.0 microns per bottle.

In the examples below, the amounts of the ingredients recited in the tables are expressed in terms of "%", which refers to percent by weight based on the weight of the total composition.

EXAMPLES 3-9

Eight compositions having the formulations set forth in Table 1 below were prepared according to the method described in Example 2 above. The term "MPMS" in the tables below represents the methoxy-chainstopped polymethylsilsequioxane prepared in Example 1 above. The term "MTES" refers to methyltriethoxysilane, "IPM" refers to isopropyl myristate, and "TBT" refers to tetrabutyltitanate.

TABLE 1

| Example No. | MPMS (%) | MTES (%) | IPM (%) | TBT (%) |
|---|---|---|---|---|
| 3 | 69.77 | 18.61 | 10.47 | 1.16 |
| 4 | 63.64 | 14.55 | 8.18 | 13.14 |
| 5 | 57.69 | 19.23 | 8.65 | 14.42 |
| 6 | 70.0 | 20.0 | 9.0 | 1.0 |
| 7 | 58.82 | 15.69 | 10.78 | 14.71 |
| 8 | 71.43 | 16.33 | 11.23 | 1.02 |
| 9 | 65.22 | 21.74 | 11.96 | 1.09 |
| 10 | 60.35 | 17.24 | 9.48 | 12.93 |

The compositions prepared in Examples 3-10 were tested for cure time, masking properties, and adhesion. The cure time refers to the period of time required by the coating to cure throughout its thickness. The degree of masking was determined by observation with the naked eye. Completeness of cure and adhesion were determined by means of rub-off and migration testing. Rub-off occurs when a silicone coating fails to adhere to the substrate and can be rubbed off in little balls of cured silicone by gentle finger pressure. Migration is detected by the Scotch (trademark) cellophane tape test. The coating is considered well cured and migration-free if a piece of No. 610 Scotch tape will stick to itself after having been first firmly pressed into the silicone coating, then removed and doubled back on itself. The results are presented in Table 2 below.

TABLE 2

| Example No. | cure time (hrs) | mask | adhesion |
|---|---|---|---|
| 3 | 24 | complete | excellent |
| 4 | 0.5 | complete | excellent |
| 5 | 0.5 | complete | excellent |
| 6 | 24 | complete | excellent |
| 7 | 0.5 | complete | excellent |
| 8 | 24 | complete | excellent |
| 9 | 24 | complete | excellent |
| 10 | 0.5 | complete | excellent |

All of the samples prepared in Examples 3-10 provided complete masking of the wet bottle surface and excellent adhesion between the coating and the glass surface. However, cure times were found to vary according to the amount of catalyst, i.e., TBT, used. The compositions containing between about 13 to about 15 percent by weight of TBT, i.e., Examples 4, 5, 7, and 10, had cure times of 30 minutes whereas those containing about 1 percent by weight of TBT, i.e., Examples 3, 6, 8, and 9, had cure times of more than 24 hours. Thus, the higher amounts of TBT were critical to attaining fast cure rates.

EXAMPLES 11-14

Examples 11-14 further illustrate the effect of catalyst level on cure time. Four compositions were prepared having the formulations set forth in Table 3 below. The percentage values are % by weight based on the total weight of the composition.

TABLE 3

| Example | MPMS (%) | MTES (%) | IPM (%) | TBT (%) |
|---|---|---|---|---|
| 11 | 69.62 | 18.99 | 10.55 | 0.84 |
| 12 | 67.90 | 18.52 | 10.29 | 3.29 |
| 13 | 64.71 | 17.65 | 9.80 | 7.84 |
| 14 | 59.2 | 16.3 | 9.04 | 15.0 |

The cure time and masking data from the compositions prepared in Examples 11-14 were measured in accordance with procedures previously described and are shown in Table 4 below.

TABLE 4

| Example | Cure Time (hours) | Mask |
|---|---|---|
| 11 | 6-10 | complete |
| 12 | 5-8 | complete |
| 13 | 3-6 | complete |
| 14 | 0.25-0.5 | complete |

The data presented in Table 4 indicates that there is a proportional relationship between the amount of catalyst used and the cure time. The more catalyst present, the faster the cure. All the samples prepared in Examples 11-14 exhibited complete cure and complete masking properties.

EXAMPLES 15-20

In Examples 15-20, the influence of catalyst levels on compositions containing diluent, specifically, the pentamer, $D_5$, was measured.

The compositions of the samples prepared in Examples 15-20 are shown in Table 5 below. These formulations were coated onto bottles at 0.06 to 0.09 grams per bottle, at thicknesses of 2.4 to about 3.6 microns. The samples were tested for cure time and masking properties at 25° C. and 60% humidity, in accordance with the procedures described previously herein. The results are shown in Table 5.

TABLE 5

| Example No. | MPMS (%) | MTES (%) | IPM (%) | TBT (%) | $D_5$ (%) | Cure Time (hrs) | mask |
|---|---|---|---|---|---|---|---|
| 15 | 69.62 | 18.99 | 10.55 | 0.84 | 0.0 | 6-10 | C |
| 16 | 55.7 | 15.2 | 8.44 | 0.67 | 20.0 | 6-12 | C |
| 17 | 34.81 | 9.5 | 5.28 | 0.42 | 50.0 | 10-15 | C |
| 18 | 58.82 | 15.69 | 10.78 | 14.71 | 0.0 | 0.5-1.0 | C |
| 19 | 47.06 | 12.55 | 8.62 | 11.77 | 20.0 | 2-4 | C |
| 20 | 29.41 | 7.85 | 5.39 | 7.36 | 50.0 | 4-6 | C |

The data presented in Table 5 shows the lower levels of catalyst an higher levels of $D_5$ result in slower cure time.

EXAMPLES 21-25

In Examples 21-25 below, the effect of TBT catalyst level on the cure time and masking properties of the compositions having the following formulation were tested:

| MPMS | 69.6% |
|---|---|
| IPM | 10.5% |
| MTES | 19% |
| $D^5$ | 76.3% |

In the samples prepared in Examples 21-25, the catalyst levels varied as shown in Table 6. The cure time and masking properties of the samples are also shown in Table 6.

TABLE 6

| Example No. | Catalyst level | Cure Time | Appearance |
|---|---|---|---|
| 21 | 2.5 | 1 hour | blotchy |
| 22 | 5 | ½ hour | blotchy |
| 23 | 7.5 | ½ hour | blotchy |
| 24 | 10 | ½ hour | blotchy |
| 25 | 15 | ½ hour | blotchy |

Although cure time is reduced, the formulations prepared in Examples 21-25 produced a blotchy coating on the wet bottle surface at increasing levels of the TBT catalyst. These results indicate that the high diluent content of the samples prevented the formation of uniform coatings on the wet glass bottle surfaces.

EXAMPLES 26-31

Examples 26-31 illustrate the effect of the diluent, specifically, pentamer, on the cure time and appearance of the coatings having the compositions set forth in Table 7 below. Each of the samples prepared in these examples had a solids content containing the following formulation:

| | |
|---|---|
| MPMS | 69.6% |
| IPM | 10.5% |
| MTMS | 19% |
| TBT | 0.84% |

The samples prepared in Examples 26-31 differed in the amount of solids contained therein. The cure time and appearance properties of the coatings prepared in these examples are shown in Table 7 below:

TABLE 7

| Example No. | Solids (%) | D5 (%) | Cure Time (hrs) | Appearance |
|---|---|---|---|---|
| 26 | 100 | 0 | 6-10 | good |
| 27 | 80 | 20 | 6-12 | good |
| 28 | 60 | 40 | 10-15 | good |
| 29 | 50 | 50 | 10-15 | blotchy |
| 30 | 30 | 70 | 15-24 | blotchy |
| 31 | 23.7 | 76.3 | 15-24 | blotchy |

The data set forth in Table 7 above indicates that higher levels of D5 result in longer cure times and reduced masking properties.

The slower cure of compositions containing higher levels of pentamer can be advantageous where severe and deep scuffing has to be masked. Because of their fast cure rate, solutions containing high solids content and high catalyst levels may not mask severe and deep scuffs in a very short time. In general, however, it has been found that the scuffing on glass bottles is severe but not very deep. Thus, fast curing compositions such as that of the present invention are suitable scuff-masking agents for glass bottles.

What is claimed is:

1. An improved curable coating composition suitable for concealing scuff marks on glass articles, comprising by weight:
   (A) from about 70 to about 100 percent of a composition comprising by weight:
      (1) from about 50 to 75 percent of an organooxy-chainstopped organopolysilsequioxane having a viscosity of from about 5 to about 1000 centipoise at 25° C. and consisting essentially of $RSiO_{3/2}$ units and $R(R^1O)_{3-2n}SiO_n$ units, wherein n is a number equal to 0, ½, or 1, wherein R and $R^1$ are independently a monovalent hydrocarbon radical containing from 1 to about 20 carbon atoms, the ratio of $RSiO_{3/2}$ units to $R(R^1O)_{3-2n}SiO_n$ units being from about 1:1 to about 50:1;
      (2) from about 5 to about 15 percent of tetraorganotitanate, having the general formula $Ti(OR^2)_4$ wherein $R^2$ is a monovalent hydrocarbon radical containing from about 1 to about 10 carbon atoms;
      (3) from about 10 to about 20 percent of an organotriorganooxysilane having the general formula $R^3(R^4O)_3Si$, wherein $R^3$ and $R^4$ are independently monovalent hydrocarbon radicals containing from 1 to about 20 carbon atoms; and
      (4) from about 0 to about 15 percent of a carboxylic acid ester;
   (B) from about 0 to about 30 percent of a volatile diluent.

2. The composition of claim 1 wherein in component (A)(1) R and $R^1$ are each alkyl groups.

3. The composition of claim 2 wherein R and $R^1$ are each methyl.

4. The composition of claim 1 wherein in component (A)(2) $R^2$ has 2 to about 8 carbon atoms.

5. The composition of claim 4 wherein component (A)(2) is tetrabutyltitanate.

6. The composition of claim 1 wherein in component (A)(3) $R^3$ and $R^4$ are alkyl groups.

7. The composition of claim 6 wherein component (A)(3) is a methyltriethoxysilane.

8. The composition of claim 1 wherein component (A)(4) is a carboxylic acid ester having from about 6 to about 22 carbon atoms.

9. The composition of claim 8 wherein component (A)(4) is isopropyl myristate.

10. The composition of claim 1 wherein component (B) is cyclomethicone silicone tetramer or cyclomethicone silicone pentamer.

11. The composition of claim 10 wherein component (B) is cyclomethicone pentamer.

12. The composition of claim 1 wherein component (B) is phenethylpentamethyldisiloxane.

13. The composition of claim 1 wherein composition (A) is present in an amount within the range of from about 80 to about 100 percent by weight.

14. The composition of claim 13 wherein composition (A) is present in an amount within the range of from about 90 to about 100 percent.

15. The composition of claim 1 wherein component (A)(1) is present in an amount within the range of from about 60 to about 70 percent.

16. The composition of claim 11 wherein component (A)(1) is present in an amount within the range of from about 60 to about 65 percent.

17. The composition of claim 1 wherein component (A)(2) is present in an amount within the range of from about 8 to about 15 percent.

18. The composition of claim 17 wherein component (A)(2) is present in an amount within the range of from about 12 to about 15 percent.

19. The composition of claim 1 wherein component (A)(3) is present in an amount within the range of from about 14 to about 20 percent.

20. The composition of claim 1 wherein component (A)(4) is present in an amount within the range of from about 5 to about 15 percent.

21. The composition of claim 20 wherein component (A)(4) is present in an amount within the range of from about 8 to about 12 percent.

22. The composition of claim 1 wherein component (B) is present in an amount within the range of from about 0 to about 20 percent.

23. The composition of claim 22 wherein component (B) is present in an amount within the range of from about 0 to about 10 percent.

24. The cured composition of claim 1.

25. A composite comprising a glass article having disposed on the surface thereof the curable composition of claim 1.

26. The composite of claim 25 wherein the glass article is a bottle.

27. A composite comprising a glass article having disposed on the surface thereof the cured composition of claim 1.

28. The composite of claim 27 wherein the glass article is a bottle.

29. An improved coating composition suitable for concealing scuff marks on glass articles, comprising by weight:
 (A) from about 90 to about 100 percent of a component comprising by weight:
  (1) from about 60 to 65 percent of an organooxy-chainstopped organopolysilsequioxane having a viscosity of from about 5 to about 1000 centipoise at 25° C. and consisting essentially of $RSiO_{3/2}$ units and $R(R^1O)_{3-2n}SiO_n$ units, wherein n is a number equal to 0, ½, or 1, wherein R and $R^1$ are independently a monovalent hydrocarbon radical containing from 1 to about 20 carbon atoms, the ratio of $RSiO_{3/2}$ units to $R(R^1O)_{3-2n}SiO_n$ units being from about 4:1 to about 8:1;
  (2) from about 12 to about 15 percent of tetrabutyltitanate;
  (3) from about 14 to about 20 percent of methyltriethoxysilane; and
  (4) from about 8 to about 12 percent of isopropyl myristate;
 (B) from about 0 to about 10 percent of a cyclomethicone silicone pentamer.

30. The cured composition of claim 29.

31. A composite comprising a glass article having disposed on the surface thereof the curable composition of claim 29.

32. The composite of claim 31 wherein the glass article is a bottle.

33. A composite comprising a glass article having disposed on the surface thereof the cured composition of claim 29.

34. The composite of claim 33 wherein the glass article is a bottle.

* * * * *